Nov. 11, 1924.  
A. C. SMITH  
1,515,418  
LINE TAKE-UP DEVICE  
Filed March 10, 1924

A. C. Smith,
INVENTOR

BY Victor J. Evans
ATTORNEY

WITNESS:

Patented Nov. 11, 1924.

1,515,418

UNITED STATES PATENT OFFICE.

ARTHUR C. SMITH, OF MERIDEN, CONNECTICUT.

LINE TAKE-UP DEVICE.

Application filed March 10, 1924. Serial No. 698,223.

*To all whom it may concern:*

Be it known that I, ARTHUR C. SMITH, a citizen of the United States, residing at Meriden, in the county of New Haven and State of Connecticut, have invented new and useful Improvements in Line Take-Up Devices, of which the following is a specification.

This invention contemplates the provision of a take up for clothes lines or the like, and by means of which the slack in the line can be conveniently and easily taken care of, and eliminates the tedious duty of untying knots in such lines which have been exposed to inclement weather, especially when the knots or like become frozen.

Another object of the invention resides in the provision of a device of this kind which is extremely simple in construction and which can be manufactured and sold at a very nominal cost.

In the drawing forming part of this application, like numerals of reference indicate similar parts in the several views, and wherein.

Figure 1:
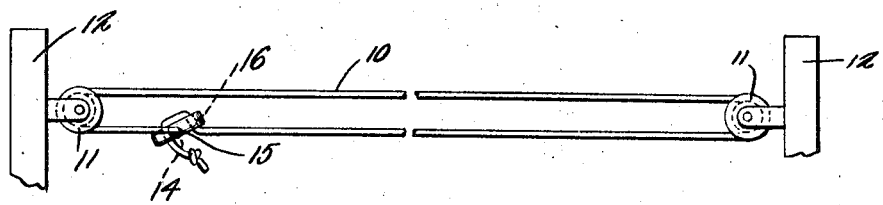
Figure 1 is a view of the clothes line showing the application of the invention.

Referring to the drawing in detail, 10 indicates a clothes line which of course is adapted to be passed about the pulleys 11 mounted upon the post 12, the adjacent ends of the line being associated with the take up device forming the subject matter of the invention.

Figure 2:
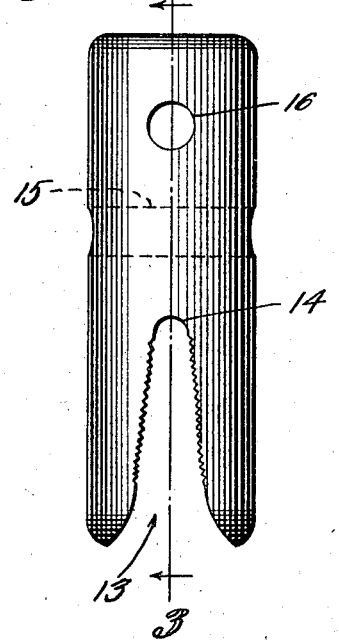
Figure 2 is a detail view of the take up device removed from the line.
Figure 3:
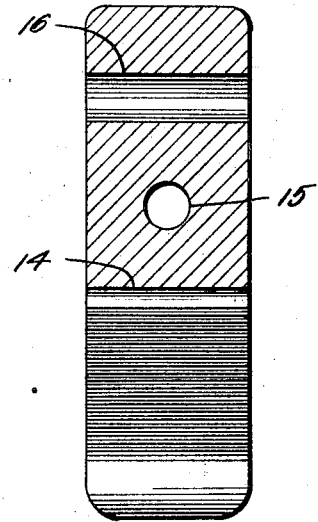
Figure 3 is a sectional view taken on the line 3—3 of Figure 2.

This invention is preferably constructed from wood although any suitable material may be employed, and the device can vary in size and configuration without departing from the spirit of the invention. Upon inspection of Figures 2 and 3, it will be obvious that the device very much resembles a clothes pin in that the device is bifurcated at one end as at 13, and in a manner to provide a substantially wedge shaped passage or slot 14. The upper portion of the device is provided with spaced transverse bores 15 and 16 respectively, and which bores are arranged at right angles to each other. The application of the device to the line is clearly illustrated in Figure 1, wherein it will be noted that one end of the line passes through the transverse bore 15 and is knotted to prevent the line from being casually separated from the device, although this end of the line can be permanently secured to the device in any suitable manner. The other adjacent end of the line is passed through the bore 16 and then arranged in the slot 14, which by reason of its contour effectively holds the line from slipping. Therefore in order to remove the slack from the line, it is only necessary to pull on the free end of the rope, as the latter passes freely through the bore 16, and when the line is sufficiently taut, the free end thereof is then slipped in the slot 14 as described.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A take up device for clothes lines or the like comprising a member having transverse bores arranged at right angles to each other, one end of the line being passed through one of said bores and secured to said device, the other bore receiving the free end of the line, and said device being bifurcated at one end to define a wedge shaped slot adapted to receive the free end of the line for the purpose specified.

In testimony whereof I affix my signature.

ARTHUR C. SMITH.